United States Patent Office 3,463,757
Patented Aug. 26, 1969

3,463,757
PRODUCTION OF FIBROUS POLY-OXYMETHYLENE
Erich Bader, Hanau am Main, and Wolfgang Sibenhorn, Steinheim am Main, Germany, assignors to Deutsche Gold- und Silber-Scheideanstalt vormals Roessler, Frankfurt am Main, Germany
No Drawing. Filed May 31, 1967, Ser. No. 642,346
Claims priority, application Germany, June 10, 1966, D 50,287
Int. Cl. C08g 1/04
U.S. Cl. 260—67
5 Claims

ABSTRACT OF THE DISCLOSURE

Production of morphologically homogeneous fibrous polyoxymethylene by homogeneous mixture of a small but effective amount of a cationic catalyst with molten trioxane, quenching the thus obtained mixture to a temperature below the melting point of trioxane to effect complete crystallization of the trioxane before any noticeable polymerization has initiated and then polymerizing the thus crystallized catalyst containing trioxane at a temperature below its melting point, for instance, between +25 and 62° C.

Background of the invention

The present invention relates to an improved process for the production of fibrous polyoxymethylene by the cationic polymerization of trioxane.

It is known that fibrous polyoxymethylenes can be prepared by radiation chemical polymerization of trioxane by subjecting crystallized trioxane to an ionizing irradiation and then permitting completion of the polymerization for a longer period of time at temperatures below its melting point (French Patent 1,393,994, British Patent 984,-097).

It furthermore is known that fibrous polyoxymethylenes can be produced by cationic polymerization of trioxane suspended in a poor solvent at temperatures below the melting point of the trioxane (Journal of Polymer Science, part C, No. 4, pages 827–838, U.S. Patent 2,989,510). In all of such suspension polymerization processes, fundamentally, two different polymerization processes proceed simultaneously, in one instance, a solid phase polymerization starts from the surface of the suspended trioxane crystals which leads to polymers with fibrous structure and in the other instance the polymerization proceeds with the trioxane in the form of its saturated solution in the solvent employed which leads to finely crystalline powder formed polymers. As a consequence the suspension polymerization always leads to a mixture of two polymers which from a morphological view are substantially different.

Similarly, a mixture of two morphologically different polyoxymethylenes are obtained when a small quantity of active polymerization catalyst is added to melted trioxane and such melt slowly cooled. More or less powdered polyoxymethylene always is produced along with the fibrous polyoxymethylene (Journal of Polymer Science, part C, No. 4, page 838).

Finally, processes are also known in which solid trioxane is brought into contact with a cationic catalyst and allowed to polymerize in solid state (Dissertation of Jaacks, Mainz, Germany, 1959, French Patent 1,295,207). In such processes polymerization only occurs at the surfaces of the trioxane particles, the layers below remain as unchanged trioxane.

Summary of the invention

According to the invention it was found that, fibrous, morphologically homogeneous polyoxymethylene is produced when melted trioxane is homogeneously mixed with a small quantity of a cationically active catalyst and immediately after such admixture quenching the mixture to a temperature below the melting point of trioxane so that the total quantity of trioxane crystallizes out, whereupon the crystallized trioxane which contains the catalyst homogeneously distributed therein is polymerized at temperatures below its melting point and then removing the unconverted trioxane from the polymeric product obtained by known methods.

Detailed description of the invention including preferred embodiments

The trioxane employed in the polymerization according to the invention need not be specially purified and usual commercial, about 97 to 98% crude trioxane from which the portions which are insoluble in the melt thereof have been removed by filtration or centrifuging can be used as the starting material.

All substances known as cationic catalysts come into question as the cationic catalysts employed according to the invention, such as, for instance, Lewis acids, acid hydrogen, acids with complex anions, free halogens and oxonium salts. Especially suited as initiators are those which provide longer induction periods, such as, for example, complex compounds of Lewis acids with water, alcohols, phenols, acids, acid anhydrides, ethers and ketones. The complex compounds of borontrifluoride are especially preferred.

The quantity of catalyst employed depends upon, in addition to the catalyst selected, the purity of the trioxane employed as the inhibitors contained in technical trioxanes can block a portion of the catalyst used. The quantity of catalyst used in each instance must be such that it is possible to distribute the catalyst homogeneously in the trioxane melt and to be able to crystallize the trioxane completely before any noticeable polymerization occurs. (Any such polymerization occurring before complete crystallization of the trioxane would lead to the production of powdered polymers.) The fully crystallized catalyst containing trioxane must at this stage still be completely soluble in cold water or organic solvents. The quantity of catalyst required is best determined by routing preliminary tests.

As is apparent, a temperature below the melting point of trioxane must be used as the quenching temperature in the process according to the invention. In itself, any desired temperature below the melting point of trioxane may be employed, but it is expedient to select such a temperature difference with reference to the melting point of trioxane so that the danger of polymerization of the trioxane before it is completely crystallized is avoided. Therefore, when thicker cross-sections of the trioxane melt come into question, the temperature difference should be greater than with thinner cross-sections.

The term "quenching" is employed herein to signify, as usual, a cooling with a velocity which is greater than the velocity of the process which occurs without cooling, in the present instance therefore the formation of powder formed polyoxymethylene.

The completely crystallized catalyst containing trioxane, depending upon the activity of the catalyst employed, is then polymerized at temperatures between about 25 and 62° C. preferably, between 55 and 62° C. The yield of fibrous polyoxymethylene, thereby, depends essentially on the catalyst employed. It, however, is not generally advisable to strive for a degree of polymerization approaching 100% based upon the trioxane supplied as, for such a high degree of polymerization, the catalyst concentration required would render the induction period before initiation of the polymerization so short that it is no longer certain that the polymers produced do not contain powdery portions produced by polymerization in the melt.

In order to remove the unconverted trioxane in the polymeric product produced according to the invention, the product is coarsely comminuted and extracted with a solvent or solvent mixtures. In order to effect simultaneous destruction and neutralization of the catalyst still contained in the product it is advantageous to add basic substances to the extraction agent. If the unconverted trioxane is simply extracted with water the catalyst is also destroyed and practically a pure aqueous solution of trioxane is obtained which is especially suited for the recovery of trioxane. The fibrous polyoxymethylene from which the unconverted trioxane has been removed is then finely subdivided by known procedures. It suffices, for example, to treat an aqueous suspension of the polymer in a high speed mixture to effect its separation into fibers and to recover and dry such fibers by known methods.

As the induction period between the time the catalyst is added to the trioxane melt and the noticeable initiation of the polymerization is only a very short time and, on the other hand, the homogeneous distribution of the catalyst in the melt, its cooling to solidification temperature and removal of the heat of solidification set free require a finite period of time, it is expedient that the thickness of the molten trioxane containing the catalyst be as small as possible during the quenching. It is possible in this way to employ cold water as the cooling medium despite the poor heat conductivity of the trioxane melt.

U.S. Patent 3,299,003 describes a process for the continuous polymerization of trioxane which is easy to carry out in such a way that thin layers are obtained. The process described therein can, in modified form, be employed to obtain thin layers of the catalyst containing completely crystallized trioxane melt which preferably are employed according to the invention.

Accordingly, the desired quantity of catalyst is continuously mixed in a constant ratio with the trioxane melt which is maintained slightly above its melting point, for instance, at 65° C., and the resulting catalyst containing melt then continuously introduced into a tube shaped synthetic resin structure or casing with practically complete exclusion of air or atmospheric oxygen or moisture. The thus filled tube is then preferably continuously flattened out with an appropriate arrangement such as suitable squeezing guide rolls and also continuously passed through a cooling bath of counter-currently flowing cold water. The length of the cooling bath and the velocity of the filled tube being passed therethrough must be so adjusted with respect to each other that the catalyst containing melt is completely crystallized upon leaving the cooling bath.

The polymerization of the crystallized catalyst containing trioxane can then be carried out continuously or discontinuously. In discontinuous operation the tube filled with the crystallized catalyst containing trioxane, for example, is cut into sections of suitable length or is wound up into a roll. These pieces or rolls are then held in an oven or heating chamber at a temperature between about +25° C. and just below the melting point of trioxane, for instance, between 25 and 62° C. and, preferably, between 55 and 62° C. for the time required for the polymerization, usually several hours. The further processing then also must be carried out discontinuously.

It therefore was found more expedient if the actual polymerization also is carried out continuously. For this purpose, for example, the filled tube which was drawn horizontally through the cooling bath is folded into accordion type folds so that equally long sections stand vertically successively close to each other and the thus folded tube is continuously passed through a heating chamber held at the polymerization temperature. The length of such chamber is such that the contents of the tube are polymerized by the time it reaches the end of the chamber. The filled tube leaving the heating chamber which now contains the fibrous polymer is then again drawn off horizontally at the same velocity as it was drawn through the cooling bath. Thereafter the tube is continuously cut open and the contents continuously removed.

When suited resins are employed for the tube or casing, the material thereof after removal of the polymer can be reprocessed for reuse. Suitable materials for the tubes, for instance, are polyethylene, polyproylene, as well as other synthetic resins which are stable and inert under the conditions of the process.

The tubular structure for the casing can, for example, be produced by extrusion using an annular nozzle which is provided with a central opening for introduction of the catalyst containing trioxane melt. This procedure, however, is not the most economical as the blowing of the tube is rather slow in comparison to the filling speeds possible. It has proved more satisfactory to form the tubular structure by welding together the edges of one or two preformed weldable synthetic resin strips and shortly after formation of the tubular structure introducing the catalyst containing melt, for example, through a tube extending into the interior thereof. Instead of using the welding technique, the tubular structure can also be formed from a strip or several strips by closure with the aid of clamps, sewing, or an adhesive or an adhesive strip.

According to a further modification, a preformed tubular casing can be employed which is slit open on one side to permit continuous introduction of the catalyst containing melt and after such introduction reclosed, for example, by welding (see French Patent 1,395,904).

The advantage of the process according to the invention resides in that a morphologically homogeneous fibrous polyoxymethylene can be produced by catalytic polymerization of trioxane. The process, in contrast to radiation chemical polymerization, can be carried out continuously and practically without losses of material. The polyoxymethylene obtained according to the invention is especially suited for use as a textile material, such as filter material, as an insulation material against heat and sound, as electrical insulation material, as a filler and thickening agent for natural and synthetic resins.

The following example will serve to illustrate the process according to the invention.

Example

Technical trioxane (about 97%) was melted, filtered to remove insoluble impurities and maintained at 65° C. in a supply container. A mixture of such melted trioxane and of borontrifluoride-dimethyl etherate, as catalyst, was continuously prepared from such melted trioxane supply and a 0.5% solution of borontrifluoride-dimethyl etherate (in toluene) with the aid of two metering pumps so as to provide a mixture containing 0.0002 wt. part of catalyst per 1 wt. part of trioxane. This mixture was immediately introduced into a polyethylene tube having a wall thickness of 0.1 mm. and the filled tube passed through a cooling bath where it was squeezed by rollers to a thickness of about 1 cm. and cooled with countercurrently flowing water of a temperature of about 10° C. After a time of stay in the cooling bath of 5 minutes, the trioxane in the tube was completely crystallized when it reached the end of the bath. A stample of the thus crystallized catalyst containing trioxane was taken and found to be completely soluble in cold water. The tube with the crystallized catalyst containing trioxane was then held at 55° C. in a heating chamber for 5 hours. The tube was then cut open and the polymerized product removed and beaten up with water in a mixer to separate it into fibers and dissolve out the unconverted trioxane. The polymer was separated off and dried. A pure fibrous polyoxymethylene was obtained in a 41% yield based upon the trioxane supplied.

What is claimed is:

1. In a process for the production of fibrous polyoxymethylene by cationic polymerization of trioxane with cationic catalysts, the steps of homogeneously admixing a relatively small, but effective quantity of the cationic catalyst with molten trioxane from which insoluble impurities have been removed and immediately quenching such admixture to a temperature below the melting point of trioxane to effect complete crystallization of the trioxane to a solid crystalline product still completely soluble in water, polymerizing said solid quenched admixture consisting essentially of said catalyst and said crystalline trioxane at a temperature below the melting point of the trioxane and separating the remaining unconverted trioxane from the polymer.

2. The process of claim 1 in which the polymerization is carried out at a temperature between about 25 and 62° C.

3. The process of claim 1 in which the polymerization is carried out at a temperature between about 55 and 62° C.

4. The process of claim 2 in which the admixture is introduced into a tube shaped synthetic resin structure and the thus filled tube shaped structure continuously passed through a cooling bath in flattened out form to quench said admixture to crystallize out the trioxane completely and the polymerization of the thus obtained catalyst containing trioxane is effected while still within said tube.

5. A process according to claim 1 wherein the uncoverted trioxane is separated from the polymer by washing the polymer with water.

References Cited

UNITED STATES PATENTS

| | | | |
|---|---|---|---|
| 3,294,750 | 12/1966 | Baccaredda et al. | 260—67 |
| 3,316,217 | 4/1967 | Weissermel et al. | |

WILLIAM H. SHORT, Primary Examiner

L. M. PHYNES, Assistant Examiner